United States Patent [19]

Pratscher

[11] 4,450,648
[45] May 29, 1984

[54] INDUSTRIAL RODENT KILLING DEVICE

[76] Inventor: Andrew J. Pratscher, 267 Cornell, Calumet City, Ill. 60409

[21] Appl. No.: 427,718

[22] Filed: Sep. 29, 1982

[51] Int. Cl.³ ............................................. A01M 23/04
[52] U.S. Cl. ............................................ 43/64; 43/73; 43/79; 43/68
[58] Field of Search ............... 43/64, 68, 69, 73, 79, 43/80, 70, 74

[56] References Cited

U.S. PATENT DOCUMENTS

| | | | |
|---|---|---|---|
| 114,062 | 4/1871 | Stowe et al. | 43/68 |
| 214,013 | 4/1879 | Willford | 43/68 |
| 829,960 | 9/1906 | Mackel | 43/64 |
| 857,879 | 6/1907 | Hill | 43/73 |
| 1,436,272 | 11/1922 | McElfresh | 43/69 |
| 2,273,008 | 2/1942 | Fisher | 43/68 |
| 4,145,834 | 3/1979 | Quigley | 43/73 |
| 4,154,016 | 5/1979 | Reyes | 43/69 |
| 4,238,903 | 12/1980 | Mazzei | 43/69 |
| 4,253,264 | 3/1981 | Souza | 43/73 |
| 4,255,891 | 3/1981 | Chen | 43/64 |

FOREIGN PATENT DOCUMENTS 532206  8/1931  Fed. Rep. of Germany ......... 43/79

*Primary Examiner*—Nicholas P. Godici
*Assistant Examiner*—Kurt Rowan
*Attorney, Agent, or Firm*—Thomas W. Tolpin

[57] ABSTRACT

A rodent killing device is provided with a plurality of units of feeding and killing chambers, with each feeding chamber positioned directly above a killing chamber, so that the floor of the feeding chamber also forms the ceiling of the killing chamber. The feeding chamber attracts a rodent by bait, which then becomes entrapped within the feeding chamber, whence it is transmitted to the killing chamber by sliding the floor of the feeding chamber outwardly. The killing chamber destroys the rodent by a plurality of spikes impaling the rodent, and then the killed rodent is deposited in a container for subsequent removal. The killing of the rodent is done in a separate chamber so that no leftovers from the rodent or any ill smell is allowed to permeate into the feeding chamber, so that subsequent rodents approaching the feeding chamber are not discouraged from entering into the interior. Conduits are also provided that attract a rodent by a scent pleasant to the rodent and lead it to the interior of the feeding chamber, which conduits are U-shaped channels having holes in the bottom surface that cooperate with holes in a pipe connected to the interior of the feeding chamber, so that the food bait's odor may be allowed to permeate along the entire length of the U-shaped channels.

13 Claims, 5 Drawing Figures

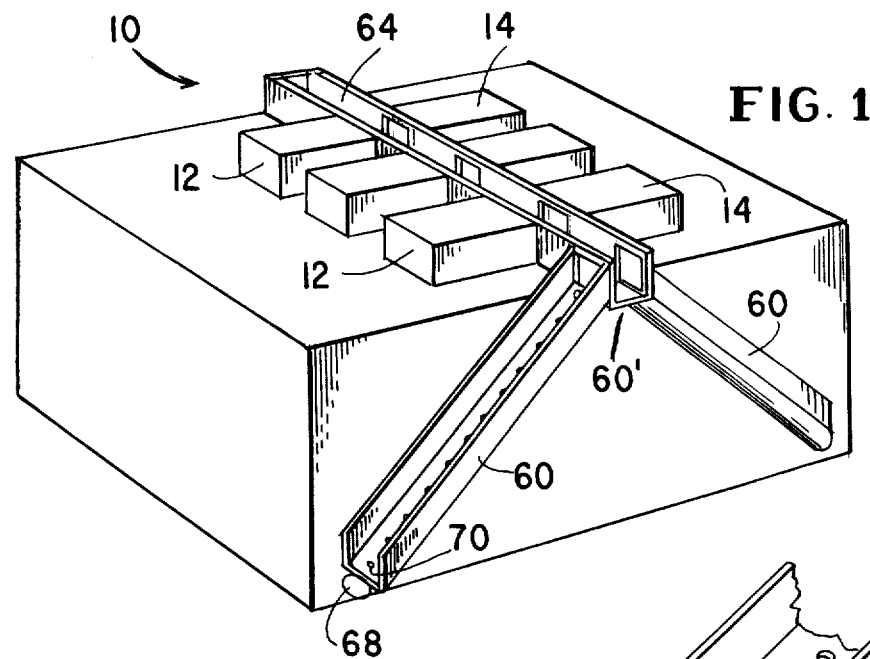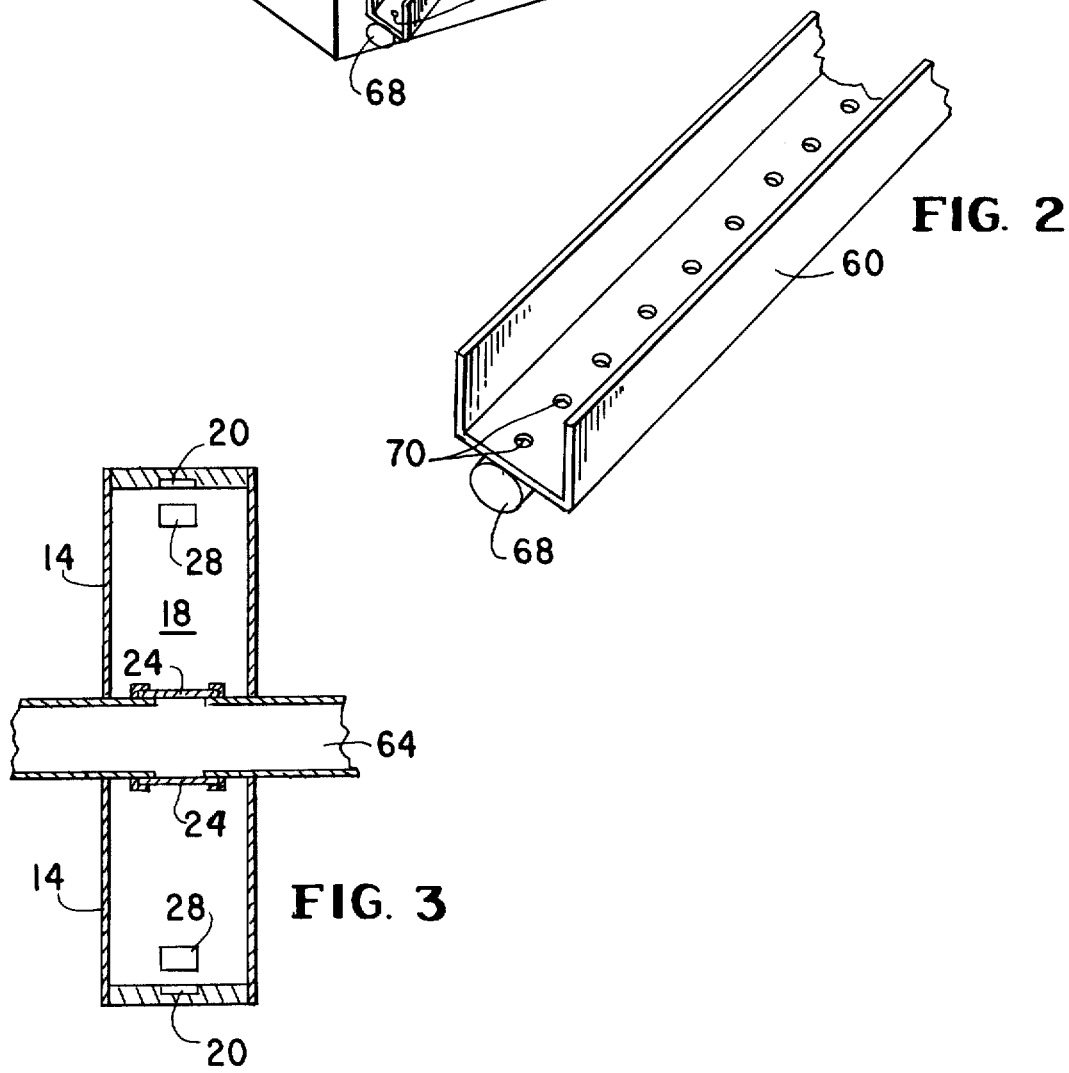

INDUSTRIAL RODENT KILLING DEVICE

BACKGROUND OF INVENTION

The present invention is directed to a device to kill rodents, such as rats, mice, and the like, in large numbers wherever such rodents are to be found.

In the farming, harvesting, and storing of food grains, it has been estimated that as much as 30% of the food products are lost to rodents, whether the food be in the field, in a silo, or in transportation. The world-wide loss due to rodent consumption has been estimated to run in the billions of dollars.

Hitherto, control of rodent pests has been limited, and usually confined to chemical pesticides. However, no real effective method or apparatus has been achieved that will efficiently eliminate the great numbers of rodent pests without adversely affecting other areas of the environment.

To this end, the present invention is directed to trapping and destroying rodents in great number at one general location so that the food present around the location will be freer from rodent consumption. Devices for entrapping and killing rodents have been known for centuries. In the modern day, the typical rat trap will utilize a spring-action member of some type that is triggered into operation upon a rodent's approaching and/or touching a food bait. Such traps are shown in U.S. Pat. Nos. 363,554; 813,333; 1,002,082; 1,120,114; and 2,061,123.

All these above-noted patents, however, suffer from the disadvantage that large numbers of rodents cannot be killed since the trap must be reset after each kill.

In U.S. Pat. No. 2,531,568, there is shown a trap that will impale a rodent upon its touching the food bait, which will trigger a solenoid which as a spear mounted to its armature. The device of this patent may be used to kill a large number of rodents, but it suffers from the disadvantage of attracting and killing the rodent in the same chamber. Rodents, and particularly rats, are very cautious, and when a rat has already been killed, and the blood or other remains thereof left behind, another rat will not venture into that same area. Thus, U.S. Pat. No. 2,531,568 will, in use, not be able to attract a large number of rats after only one or two have been killed.

SUMMARY OF THE INVENTION

It is, therefore, the primary object of the present invention to provide a rodent killing device that will exterminate a large number of rodents over a short time span, and that will insure that rodents will be continually attracted to the device where they will be entrapped and destroyed.

It is another object of the present invention to provide a rodent killing device that will reset itself after each rodent kill, and will insure that the remains of the killed rodent will not affect the odor generated by the food bait.

It is still another object of the present invention to provide a rodent killing device that will dispose of the killed rodents into a receptacle container for easy disposal after a certain time interval.

The rodent killing device of the present invention may have one or a plurality of rodent trapping and killing units mounted upon a receptacle container. Each unit has a feeding chamber in which a food bait is provided, which food bait is stored behind a wire mesh so a rodent will not be able to eat it, and, therefore, allow use of the same bait over a number of kills. Each feeding chamber is provided with a trap door that entraps the rodent within the feeding chamber after a sensing device within the interior of the feeding chamber senses the rodent's presence. After such entrapment, the ceiling of the feeding chamber, which is mounted to move vertically downwardly and upwardly, is activated to push the rodent downwardly into the killing chamber positioned directly beneath the floor of the feeding chamber. The floor of the feeding chamber is also mounted to reciprocate horizontally so that when the rodent is entrapped within the feeding chamber, the floor is moved horizontally outwardly to allow the rodent to fall into the interior of the killing chamber, whereafter, both the ceiling and floor of the feeding chamber are returned to their original positions.

In the killing chamber, the rodent is destroyed by the activation of a plurality of spikes, which impale the rodent and kill it, and, thereafter, the rodent is removed from the killing chamber and deposited into the receptacle container.

By providing a separate feeding chamber and a separate killing chamber for each rodent killing unit, any remains and/or odor from the killed rodent will not enter into the feeding chamber, so that any subsequent rodent approaching the feeding chamber will not be discouraged from entering into the interior of the feeding chamber.

To lure the rodent to the entrance of the feeding chamber, conduits are provided that lead a rodent up a ramp or ramps to the entrance of the feeding chamber. Each ramp is also provided with a pipe having a series of holes formed in its outer surface, and each pipe is connected to the interior of the feeding chamber so that the aroma from the food bait will be transmitted along the pipes to ground level, where a rodent will first enter into the conduits, to this attract a rodent to the feeding chamber at relatively great distances.

In the preferred embodiment of the invention, the floor of the killing chamber and a side wall of the killing chamber are pivotally mounted to rotate as one unit, so that after the spikes have destroyed a rodent, the floor-side wall unit is rotated to force the rodent downwardly into the receptacle container. The side wall of the killing chamber, which rotates with the floor of the killing chamber, is also provided with a plurality of passageways so that the spikes may be projected through the side wall to impale the rodent. Upon rotation of the side wall with the floor of the killing chamber, any residue left over from the rodent that may have stuck in the passageways or on the tips of the spikes are disengaged from the passageways as the side wall tilts and causes the passageways to incline, thus aiding in removing the residue by the pull of gravity and by the thrust of the air cylinder causing the rotation of the floor and side wall unit. The spikes before entering the passageways of the side wall first pass through a plurality of holes formed in a guide wall spaced from the side wall, which openings are of smaller cross-section than the cross-section of each passageway of the side wall, so that any residue still attached to the tips of the spikes may fall downwardly in the space defined between the guide wall and side wall.

BRIEF DESCRIPTION OF THE DRAWING

The invention will be more readily understood with reference to the accompanying drawing, wherein FIG. 1 is a perspective view of the industrial rodent killing device of the present invention which shows the U-channels leading from ground level to atop the container receptacle mounting the feeding and killing chambers;

FIG. 2 is a perspective view of a portion of a U-channel for leading a rodent to the feeding chamber, and which shows the scent-carrying pipe in cooperation with the U-channel;

FIG. 3 is a top view, in cross-section, of the feeding chambers of the industrial rodent killing device of the present invention, with the feeding chambers sharing a common walkway adjacent the trap door of each;

DETAILED DESCRIPTION OF THE INVENTION

Figure 4:
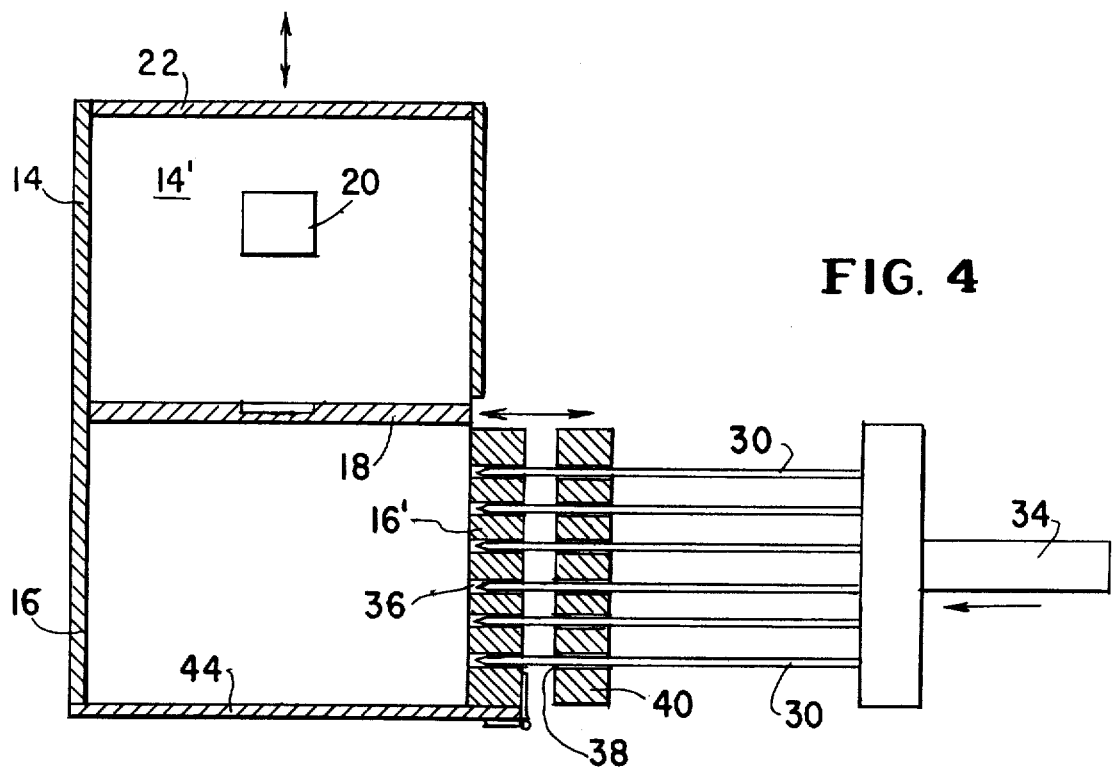
FIG. 4 is a side view, in cross-section, showing the feeding chamber and killing chamber unit that work in unison to entrap and then kill a rodent according to the industrial rodent killing device of the present invention.
Figure 5:
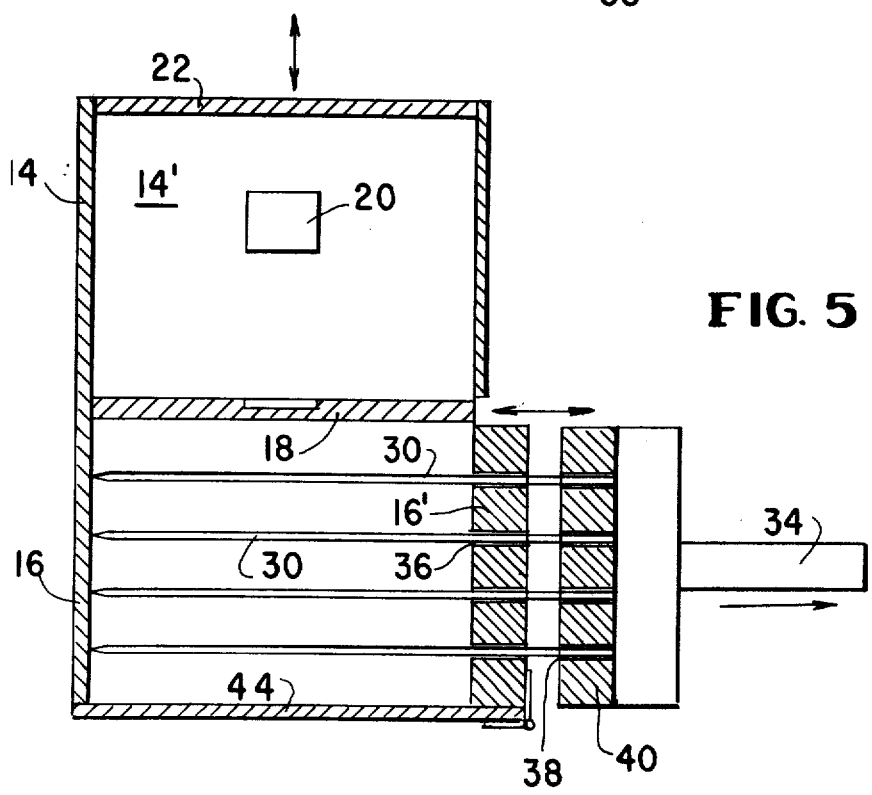
FIG. 5 is a side view, in cross-section, similar to FIG. 5, but showing the spikes that kill a rodent in the killing chamber extended within the interior of the killing chamber after impaling a rodent in the interior.

Referring now to the drawing in greater detail, the industrial rodent killing device of the present invention is shown generally by reference numeral 10. In the preferred form of the invention, a plurality of rodent feeding and killing units 12 are provided on a receptacle container, so that a plurality of rodents may be exterminated at the same time. Each unit 12 is made up of an upper feeding chamber 14 best seen in FIG. 4 and a lower killing chamber 16 directly below the feeding chamber, so that the floor 18 of the upper feeding chamber also forms the ceiling of the lower killing chamber.

The upper feeding chamber, which is preferrably cubical in configuration, though other shapes may be utilized, is provided with bait, which will lure a rodent into the interior of the chamber. Such bait is typically peanut butter or a mixture of peanut buter with a grain, such as oat or wheat. The bait is situated in a cavity of the end wall 14' of the upper chamber 14, which cavity 20 is covered as by a screen mesh, so that the aroma from the food is allowed to permeate its surroundings, yet prevent the rodent from actually eating it, so that the same bait may be used a number of times to attract a rodent. The screen mesh which covers the cavity in the end wall 14' lies flush with the inner surface of the wall, so that the ceiling 22 of the upper hamber may be lowered toward the floor 18, which operation is described below.

Referring now FIG. 3, there is shown a trap door 24 that is normally in a raised, open position to allow entry of a rodent into the interior of the upper feeding chamber. A pressure sensitive pad 28 is provided on the floor 18 of the upper chamber, whih pressure sensitive pad is conventional and well-known in the art. Upon a rodent's treading upon the pressure sensitive pad, a ciruit is closed that activates a normally-closed solenoid switch, which in turn activates an air cylinder to speedily lower the door 24 into its lower, closed position, to thus seal the rodent with the upper chamber. When the trap door 24 is lowered into its closed position, approximately simultaneously therewith, the ceiling 22 of the upper feeding chamber is lowered vertically and the floor 18 is moved horizontally sideways, so that as the floor is slid out from under the rodent, the rodent is forced to fall into the lower killing chamber 16. Since some rodents are of larger size than others, the possibility exists that a portion of the rodent, such as its head, may extend above the plane of the floor 18 when the rodent is entrapped in the lower killing portion, so to insure that the entire rodent is within the confines of the killing chamber, the ceiling 12 is lowered downwardly until it reaches adjacent (to) the plane of the floor 18. Upon reaching this location, the floor 18 is again reciprocated back to its original closed position, thus completing the entrapment of the rodent in the lower, killing chamber.

The ceiling 22 and the floor 18 are each reciprocated by conventional means by providing channelled pathways for the edge surfaces of each, and respective air cylinders reciprocate the ceiling and floor in response to the operation of a solenoid switch. The exact timing sequence may be readily achieved in a manner that is well-known in the art and conventional, as by conventional sensing switches located near the end point of travel of each of the ceiling, floor and trap door.

Once the trapped rodent is located in the killing chamber 16, it can be destroyed effectively without having any remains of the rodent positioned within the upper feeding chamber, which, if occurred, would deter other rodents from entering the upper feeding chamber, since other rodents would sense death through their sense of smell that it is a trap, and would, also, in time, overpower the smell provided by the bait.

It is noted that as the ceiling 22 decends toward the lower killing chamber, the bait does not interfere with the movement of the deiling since it is enclosed in a cavity of the end wall 14'.

Once the rodent is positioned in the lower killing chamber, a plurality of spikes 30 are protruded forcibly into the interior of the killing chamber, to thus impale the rodent and destroy it. The spikes 30 are mounted to a mounting plate which is affixed to a piston 34 operated by a conventional air cylinder. The side wall 16' of the killing chamber is provided with a plurality of passageways 36 through which the ends of the spikes 30 project to kill a rodent. The shank portion of the spikes 30 are inserted through a plurality of openings 38 provided in a guide wall 40. The opendings 38 are in alignment with the passageways 36 so that each spike, when in its extended operating position, will extend through a respective passageway and opening. The guide wall 40 is spaced from the side wall 16', as clearly shown in FIG. 4, so that when the spikes are retracted after impaling a rodent, any residue from the remains of the rodent will fall down the gap between the guide wall and side wall. Further, to accommodate the arrow-shaped ends of each spike, each passageway 36 is larger in cross-section than an opening 38.

After the rodent has been impaled in the killing chamber, it must be disposed of, which is achieved, in the preferred form of the invention, by pivotally mounting the floor 44 of the killing chamber as at 50. The floor 44 and side wall 16' rotate as a unit, and, as seen in FIG. 4, they rotate in the counter-clockwise direction to force a killed rodent downwardly. That is, when the unit rotates in the counter-clockwise direction, the upper portion of the side wall enters the interior of the chamber 16 and forces the killed rodent downwardly, which killed rodent will exit through the space vacated by the floor 44 upon its rotation in the counter-clockwise direction. After disposal, which is preferrably in a receptacle container, the unit is rotated in the clockwise direction to its original position shown in FIG. 4. The unit may be rotated by any conventional means, as a swivel-mounted piston-cylinder arrangement.

It is pointed out that as the side wall 16' is rotated in the counter-clockwise direction as viewed in FIG. 4, the passageways 36 will tend to a verticle incline, which will aid in the removal of any material stuck therein from the ends of the spikes, such removal being accomplished by gravity and by the reaction to the thrust created upon the return of the side wall to its original position when rotated in the clockwise direction. Such removal is advantageous to prevent foul-smelling odors from occurring in the killing chamber, which may permeate to the outside via the floor 18 or other avenues of escape, which odor would warn other rodents that a trap is present.

In an alternative form, the floor 44 may be reciprocated in the horizontal direction to thereby deposit the killed rodent into the receptable container. In this alternative, the side wall 16' is fixed, and the floor is reciprocated by a conventional air cylinder, via grooved channels in the bottom surface of the side wall 16'.

As shown in FIG. 1, a plurality of feeding chamber-killing chamber units may be provided on the upper surface of the receptacle container, with the upper feeding chamber 14 lying above the plane of the upper surface of the container 50, and the lower killing chamber lying below the upper surface of the container. While only two such units 12 have been shown in FIG. 1, it is to be understood that many more may be provided in like manner.

To allow a rodent to get to the feeding chamber and enter through the opening formed by the trap door 24, conduits 60 are provided, which conduits are preferrably U-shaped channel members. The conduits 60 meet at the top end 60' thereof, and communicate with a walkway 64 which guides the rodent past a series of open feeding chambers, as shown in FIGS. 1 and 3.

To first attract a rodent to enter the conduit, each U-shaped channel member is provided with a pipe 68 that has a series of holes 70 formed in its surface, which cooperate with a series of holes formed in the conduits (see FIG. 2). Each end of a pipe 68 is connected to a common pipe (not shown) that has one of its ends affixed to a side wall of the feeding chamber 14 and projects through the side wall so that it is in fluid communication with the interior of the feeding chamber, so that the aroma from the bait stored in the feeding chamber is sent along the pipes 68 and, therefore, along the conduit trail. A rodent entering the bottom of any conduit 60 will immediately smell the aroma from the food stored in the feeding chamber, and will be led along the conduit into the feeding chamber by the same smell.

In use, the sequence of operation is as follows. A rodent will travel up a conduit, attracted by the pleasant aroma of the bait, until he enters the feeding chamber via the open door. When the rodent tries to locate the bait and eat it, he will depress the pressure sensitive pad, and thereby close the circuit to the solenoid switch operating the air cylinder of the door, thus closing the door swiftly. Almost simultaneously with the closing of the door, the ceiling of the feeding chamber will descend while the floor of the feeding chamber will be moved horizontally outwardly, so that the rodent will fall into the killing chamber below, with the lowered ceiling of the feeding chamber insuring that the entire rodent is contained within the confines of the killing chamber. Next, the sliding floor of the feeding chamber will return to its normally-closed position, and the ceiling will be raised to its normal height. Upon entry of the rodent into the killing chamber, the spikes will be activated to impale the rodent and kill it, and then the rotating unit of floor and side wall of the killing chamber will be rotated counter-clockwise to dispose of the rodent into the receptacle container below. Simultaneous with the rotation of the unit, the spikes are withdrawn to their original retracted position. Suitable relay switches are provided to control the sequence of operation, which switches are of conventional design. It is noted that other rodent sensing means may be provided besides the pressure sensitive pad 28, such as photoelectric sensing means. After a sufficient time has elapsed, for example 2 days, the receptacle's container is emptied of its contents, and new supplies of food bait are provided.

The air cylinders used to control the movement of the feeding chamber door, floor and ceiling, and the rotation of the killing chamber floor and side wall is preferably a spring-return solenoid-controlled air cylinder, and typically has a bore of 1⅛ inches and a stroke of 4 inches, such as provided by Model SRS manufactured by Carter Controls, Inc. of Lansing, Ill. To operate the spikes 30, an air cylinder having a 3 inch bore and a 4 inch stroke is preferrably used, which will provide a force of about 700 points for air pressure of 100 psi, such air cylinder being provided by Carter Controls, Inc.

While specific embodiments of the invention have been described and shown, it is to be understood that numerous changes and modifications may be made therein without departing from the scope and spirit of the invention as defined in the appended claims.

What is claimed is:

1. An industrial rodent killing device, comprising:
   a feeding chamber having means for entrapping a rodent therein;
   a killing chamber, said killing chamber being selectively accessible to said feeding chamber so as to deposit a rodent from said feeding chamber into said killing chamber;
   means for selectively accessing said feeding chamber and said killing chamber so that a rodent may be deposited in said killing chamber from said feeding chamber, such that said feeding chamber and said killing chamber are at certain intervals open to each other to form a passageway therebetween for passage of a rodent therethrough;
   means for killing a rodent in operational relationship with said killing chamber, whereby a rodent entrapped in said feeding chamber is forced into said killing chamber where it is destroyed;
   said feeding chamber being positioned above said killing chamber and having a floor that is reciprocally movable from a closed position to an open retracted position whereby a rodent may fall into said killing chamber;
   said means for selectively accessing said feeding chamber and said killing chamber comprising means for reciprocating said floor between its open retracted position and its closed position;
   said feeding chamber further comprising a reciprocally vertically moving ceiling; and
   means for reciprocating said ceiling from its upper position during entrapment of a rodent, to a lower position adjacent to the upper portion of said killing chamber to thereby force a rodent entrapped in said feeding chamber downwardly into said killing chamber.

2. An industrial rodent killing device, comprising:
a feeding chamber having means for entrapping a rodent therein;
a killing chamber, said killing chamber being selectively accessible to said feeding chamber so as to deposit a rodent from said feeding chamber into said killing chamber;
means for selectively accessing said feeding chamber and said killing chamber so that a rodent may be deposited in said killing chamber from said feeding chamber, such that said feeding chamber and said killing chamber are at certain intervals open to each other to form a passageway therebetween for passage of a rodent therethrough;
means for killing a rodent in operational relationship with said killing chamber, whereby a rodent entrapped in said feeding chamber is forced into said killing chamber where it is destroyed;
said means for killing a rodent comprising a plurality of spikes movable into the interior of said killing chamber to impale a rodent therein;
means mounting said spikes for reciprocal movement toward and away from said interior of said killing chamber;
means for reciprocating said means mounting said spikes; and
a guide wall having a plurality of openings formed therethrough for insertion therein of said plurality of spikes;
said killing chamber having a side wall defining a plurality of passageways formed therethrough for passage of said plurality of spikes into said interior of said killing chamber.

3. An industrial rodent killing device, comprising:
a feeding chamber having means for entrapping a rodent therein;
a killing chamber, said killing chamber being selectively accessible to said feeding chamber so as to deposit a rodent from said feeding chamber, such that said feeding chamber and said killing chamber are at certain intervals open to each other to form a passageway therebetween for passage of a rodent therethrough;
means for killing a rodent in operational relationship with said killing chamber, whereby a rodent entrapped in said feeding chamber is forced into said killing chamber where it is destroyed;
said killing chamber comprising means for dumping a killed rodent therefrom into a collector adjacent said killing chamber, a side wall having a plurality of passageways through which said means for killing project, and a floor connected to said side wall along an edge surface of each of said side wall and said floor;
means for pivotally mounting said side wall and said floor at the connection of said side wall and said floor so that said side wall and said floor are rotatable together as a unit; and
said means for dumping comprising means for rotating said side wall and said floor such that a portion of said side wall rotates within the interior of said killing chamber to force a killed rodent downwardly toward said floor while said floor rotates away from the interior of said killing chamber to thereby provide an open passageway through which the killed rodent will exit and fall into said collector.

4. An industrial rodent killing device, comprising:
a feeding chamber having means for entrapping a rodent therein;
a killing chamber, said killing chamber being selectively accessible to said feeding chamber so as to deposit a rodent from said feeding chamber into said killing chamber;
means for selectively accessing said feeding chamber and said killing chamber so that a rodent may be deposited in said killing chamber from said feeding chamber, such that said feeding chamber and said killing chamber are at certain intervals open to each other to form a passageway therebetween for passage of a rodent therethrough;
means for killing a rodent in operational relationship with said killing chamber, whereby a rodent entrapped in said feeding chamber is forced into said killing chamber where it is destroyed;
conduit means for leading a rodent to said feeding chamber, said conduit means comprising U-shaped channels and having a first end adjacent said feeding chamber and at least one second end adjacent the ground so that a rodent may walk along said conduit means into said feeding chamber; and
scent means for attracting a rodent along the path of said conduit means, said scent means comprising pipe means having a series of holes formed in the surface of said pipe means communicating with said U-shaped channels to provide a scent substantially along the entire length of said conduit means to lead a rodent to said feeding chamber.

5. An industrial rodent killing device, comprising:
a plurality of feeding chambers each having means for entrapping a rodent therein;
a plurality of killing chambers, each of said killing chambers being selectively accessible to one of said feeding chambers so as to deposit a rodent from said feeding chamber into said killing chamber;
means for selectively accessing said feeding chambers and said killing chambers so that rodents may be deposited in said killing chambers from said feeding chambers, such that said feeding chambers and said killing chambers are at certain intervals open to each other to form a passageway therebetween for passage of a rodent therethrough;
means for killing a rodent in operational relationship with said killing chambers, whereby rodents entrapped in said feeding chambers are forced into said killing chambers where they are destroyed;
mounting means for mounting said plurality of feeding chambers and said plurality of killing chambers, said mounting means comprising an upper surface which mounts thereon said feeding chambers and said killing chambers;
each of said plurality of feeding chambers lying above said upper surface;
each of said plurality of killing chamber lying below said upper surface;
each of said feeding chambers cooperating with a respective one os said killing chambers to provide a rodent killing unit;
conduit means for leading rodent to said plurality of feeding chambers;
said mounting means having a hollow interior for receiving the killed rodents destroyed in said killing chambers; and
each of said killing chambers having means for depositing a killed rodent into said hollow interior.

6. The industrial rodent killing device according to claim 1, wherein said feeding chamber includes attracting means for luring a rodent into said feeding chamber, said attracting means being in fluid communication with said feeding chamber.

7. The industrial rodent killing device according to claim 1, wherein said feeding chamber has a side wall defining a cavity for containing food to attract a rodent and a screen substantially covering said cavity to allow the aroma from the food to generally permeate the surroundings and substantially prevent the rodent from accessing said food so that the food may be used many times to attract a rodent.

8. The industrial rodent killing device according to claim 2, wherein each of said plurality of passageways has a larger cross-section than a corresponding one of said plurality of openings formed in said guide wall.

9. The industrial rodent killing device according to claim 3, wherein said killing chamber further comprises a horizontally reciprocal floor, and said means for dumping comprises means for reciprocating said sliding floor between an open, retracted position where a killed rodent will fall into the collector, and a normally-closed position.

10. The industrial rodent killing device, comprising:
a killing chamber having a plurality of side walls, and a floor, one of said side walls having a plurality of passageways formed therethrough;
rodent killing means comprising a plurality of spikes insertable through said plurality of passageways into the interior of said killing chamber to kill a rodent contained therein, and means for reciprocally moving said spikes into and out of said interior of said killing chamber; and
a guide wall spaced from said one side wall and parallel therewith, said guide wall having a plurality of openings formed therethrough in alignment with said plurality of passageways of said one side wall, so that when said spikes are inserted through said plurality of openings of said guide wall, they will extend through said plurality of passageways of said one side wall when said means for reciprocally moving said spikes into the interior of said killing chamber;
the cross-section of each of said plurality of passageways of said one side wall being greater than the cross-section of each of said plurality of openings of said guide wall, so that when said spikes are withdrawn from the interior of said killing chamber after killing the rodent, any remains attached to the spikes will be pulled off the spikes and allowed to fall to a collecting receptacle via a space between said one side wall and said guide wall.

11. The industrial rodent killing device according to claim 10, wherein said floor of said killing chamber is horizontally reciprocally movable between an open, retracted position and a closed position, so that a destroyed rodent may fall to a collecting receptacle positioned below said floor.

12. The industrial rodent killing device according to claim 10, wherein said one side wall and said floor are rotatable together as a unit, said killing chamber comprising means for privotally mounted said floor and said one side wall together to rotate as a unit; and means for rotating said floor and said side wall as a unit so that upon rotation of said unit, said one side wall is moved into the interior of said killing chamber while said floor is moved away from said interior, so that a destroyed rodent in said killing chamber is urged downwardly toward the collecting receptacle.

13. The industrial rodent killing device according to claim 10 including a feeding chamber in which is placed a means for luring a rodent; means for entrapping the rodent in said feeding chamber; and conduit means for leading a rodent to said feeding chamber, said conduit means comprising scent means having a first end in fluid communication with the interior of said feeding chamber, and at least one second end positioned near ground level, said conduit means also having at least one pathway for directing the rodent ito said feeding chamber, said scent means and said at least one pathway cooperating so that said scent means provides a scent trail along the length of said at least one pathway.

* * * * *